United States Patent
Kelly et al.

(10) Patent No.: US 11,893,003 B2
(45) Date of Patent: Feb. 6, 2024

(54) BATCHING WAVEFORM DATA

(71) Applicant: Google LLC, Mountain View, CA (US)

(72) Inventors: Julian Shaw Kelly, Santa Barbara, CA (US); Matthew Neeley, Goleta, CA (US)

(73) Assignee: Google LLC, Mountain View, CA (US)

( * ) Notice: Subject to any disclaimer, the term of this patent is extended or adjusted under 35 U.S.C. 154(b) by 151 days.

(21) Appl. No.: 16/975,025

(22) PCT Filed: Mar. 20, 2018

(86) PCT No.: PCT/US2018/023369
§ 371 (c)(1),
(2) Date: Aug. 21, 2020

(87) PCT Pub. No.: WO2019/182570
PCT Pub. Date: Sep. 26, 2019

(65) Prior Publication Data
US 2021/0004365 A1 Jan. 7, 2021

(51) Int. Cl.
*G06F 16/00* (2019.01)
*G06F 16/23* (2019.01)
(Continued)

(52) U.S. Cl.
CPC ........ *G06F 16/2365* (2019.01); *G06F 9/3853* (2013.01); *G06N 10/00* (2019.01)

(58) Field of Classification Search
CPC .... G06F 16/2365; G06F 9/3853; G06N 10/00
(Continued)

(56) References Cited

U.S. PATENT DOCUMENTS

2006/0123349 A1* 6/2006 Wakabayashi ........ G06T 11/206
715/764
2017/0357561 A1* 12/2017 Kelly .................. G06F 11/2273
(Continued)

FOREIGN PATENT DOCUMENTS

JP 2002/281572 9/2002
JP 2002281572 A * 9/2002

OTHER PUBLICATIONS

PCT International Preliminary Report on Patentability in International Appln. No. PCT/US2018/023369, dated Sep. 22, 2020, 14 pages.
(Continued)

*Primary Examiner* — Irete F Ehichioya
*Assistant Examiner* — Shirley D Hicks
(74) *Attorney, Agent, or Firm* — Fish & Richardson P.C.

(57) ABSTRACT

Methods and apparatus for generating waveforms for application in a quantum computing device. In one aspect, a system comprises a batch generator that receives experiment data sets defining respective experiments, each experiment data set comprising a set of waveforms defined by respective waveform data; determines unique waveforms; generates a corresponding set of respective waveform data that includes the respective waveform data for each unique waveform; generates, for each of the experiments, a waveform list that references the respective waveform data in the set of respective waveform data that corresponds to the waveforms in the set; and batch instructions that are executable by waveform generator hardware and that cause the waveform generator hardware to process each waveform list by selecting each referenced waveform data in the waveform list; and generate, in response to the selected waveform data, a waveform that is suitable for application in a quantum computing device.

20 Claims, 5 Drawing Sheets

(51) Int. Cl.
*G06N 10/00* (2022.01)
*G06F 9/38* (2018.01)

(58) Field of Classification Search
USPC .................................................. 707/600–899
See application file for complete search history.

(56) References Cited

U.S. PATENT DOCUMENTS

2018/0032099 A1\* 2/2018 Xiao ..................... G06F 1/0328
2019/0049495 A1\* 2/2019 Ofek ..................... G06F 9/5027

OTHER PUBLICATIONS

PCT International Search Report and Written Opinion in International Appln. No. PCT/US2018/023369, dated Dec. 17, 2018, 3 pages.
CA Office Action in Canadian Application No. 3,093,634, dated Sep. 22, 2021, 5 pages.
Notice of Allowance in Canadian Appln. No. 3,093,634 dated Oct. 19, 2022, 1 page.

\* cited by examiner

BATCHING WAVEFORM DATA

CROSS-REFERENCE TO RELATED APPLICATION

This application is a National Stage Application under 35 U.S.C. § 371 and claims the benefit of International Application No. PCT/US2018/023369, filed Mar. 20, 2018. The disclosure of the foregoing application is hereby incorporated by reference in its entirety.

BACKGROUND

This specification relates to quantum computing.

Classical computers have memories made up of bits, where each bit can represent either a zero or a one. Quantum computers maintain sequences of quantum bits, called qubits, where each quantum bit can represent a zero, one or any quantum superposition of zeros and ones. Some realizations of quantum computers can be operated by setting qubits in an initial state and manipulating the qubits via generation and application of waveforms, e.g., electromagnetic waveforms, representing different operations. Such waveforms may be generated via direct digital synthesis with a suitable waveform generator.

SUMMARY

This specification describes methods and systems for batching waveform data for rapid data taking from a quantum computing system.

In general, one innovative aspect of the subject matter described in this specification can be implemented in a system implemented by one or more computers, comprising: a batch generator that: receives as input a plurality of experiment data sets that each defines a respective experiment, each experiment data set comprising a set of waveforms, wherein each waveform in the set of waveforms is defined by respective waveform data; determines, from the respective waveform data for each waveform in each experiment data set, unique waveforms; generates, from the identified unique waveforms, a corresponding set of respective waveform data that includes the respective waveform data for each unique waveform; generates, for each set of waveforms of the plurality of experiments, a waveform list that references the respective waveform data in the set of respective waveform data that corresponds to the waveforms in the set; and batch instructions that are executable by waveform generator hardware and that cause the waveform generator hardware, upon execution, to process each waveform list by selecting each referenced waveform data in the waveform list; and generate, in response to the selected waveform data, a waveform that is suitable for application in a quantum computing device; wherein the batch generator generates the corresponding set of respective waveform data, the waveform lists and the batch instructions as a set of batched waveform data.

The system can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the system further comprises a batch queue that receives, from the batch generator, the batched waveform data for the experiment data sets and stores the batched waveform data in a processing queue.

In some implementations each experiment data set includes parameter data defining a set of hardware parameter values, and wherein the batch generator: determines, for a second experiment data set received subsequent to a first experiment data set, whether the set of hardware parameter values in the second experiment data set are consistent with the set of hardware parameter values in the first experiment data set; and expands the batched waveform data to include a set of waveform data of the second experiment data set only if the set of hardware parameter values in the second experiment data set are determined to be consistent with the set of hardware parameter values in the first experiment data set.

In some implementations the operations performed by the system further comprises, in response to determining that the set of hardware parameter values in the second experiment data set are not consistent with the set of hardware parameter values in the first experiment data set, generating a second a set of batched waveform data for the second experiment data.

In some implementations the set of hardware parameter values include one or more of microwave frequency, microwave power, or voltage bias.

In some implementations the batch generator: determines, for a second experiment data set received subsequent to a first experiment data set, whether a corresponding set of respective waveform data for the second experiment data intersects with the set of batch waveform data for the first experiment; and expands the batched waveform data to include the set of waveform data for the second experiment data only if the set of waveform data for the second experiment data intersects with the set of batch waveform data for the first experiment.

In some implementations the actions performed by the system further comprise, in response to determining that the set of waveform data for the second experiment data does not intersect with the set of batch waveform data for the first experiment, generating a second set of batched waveform data for the second experiment data.

In some implementations the batch generator: expands the batched waveform data to include a set of waveform data for the second experiment data set only if the size of the expanded batched waveform data does not exceed a size limit that is dependent on space available in a memory accessible by the waveform generator hardware.

In some implementations the system further comprises an in-flight batch monitor that receives, from the quantum computing device, status data describing the status of experiments being conducted using batched waveform data and, based on a detected status condition, causes the batch generator to generate a set of batched waveform data for experimental data for a partial set of experiments from experiment data that is being processed by the batch generator and causes the batch queue to provide the experimental data for the partial set of experiments for processing by the waveform generator hardware.

In some implementations the detected status condition is a status condition indicating an underutilization of the quantum computing device.

In some implementations the system further comprises a memory manager that receives, from the batch queue, sets of batched waveform data and writes the sets of batched waveform data to a memory accessed by the waveform generator hardware.

In some implementations the memory manager allocates for writing at any one time no more than one half of memory available in the memory accessed by the waveform generator hardware.

In general, another innovative aspect of the subject matter described in this specification can be implemented in a method that includes the actions of receiving as input a plurality of experiment data sets that each define a respective experiment, each experiment data set comprising a set of waveforms, wherein each waveform in the set of waveforms is defined by respective waveform data: determining from the respective waveform data for each waveform in each experiment data set, unique waveforms; generating, from the identified unique waveforms, a corresponding set of respective waveform data that includes the respective waveform data for each unique waveform; generating, for each set of waveforms of the plurality of experiments, a waveform list that references the respective waveform data in the set of respective waveform data that corresponds to the waveforms in the set; generating batch instructions that are executable by waveform generator hardware and that cause the waveform generator hardware, upon execution, to process each waveform list by selecting each referenced waveform data in the waveform list; and generate, in response to the selected waveform data, a waveform that is suitable for application in a quantum computing device; wherein the corresponding set of respective waveform data, the waveform list and the batch instructions are generated as a set of batched waveform data.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations each experiment data set includes parameter data defining a set of hardware parameter values, and the method further comprises: determining, for a second experiment data set received subsequent to a first experiment data set, whether the set of hardware parameter values in the second experiment data set are consistent with the set of hardware parameter values in the first experiment data set; and expanding the batched waveform data to include a set of waveform data of the second experiment data set only if the set of hardware parameter values in the second experiment data set are determined to be consistent with the set of hardware parameter values in the first experiment data set.

In some implementations the method further comprises, in response to determining that the set of hardware parameter values in the second experiment data set are not consistent with the set of hardware parameter values in the first experiment data set, generating a second a set of batched waveform data for the second experiment data.

In some implementations the set of hardware parameter values include one or more of microwave frequency, microwave power, and voltage bias.

In some implementations the method further comprises determining, for the second experiment data set received subsequent to the first experiment data set, whether a corresponding set of respective waveform data for the second experiment data intersects with the set of batch waveform data for the first experiment; and expanding the batched waveform data to include the set of waveform data for the second experiment data only if the set of waveform data for the second experiment data intersects with the set of batch waveform data for the first experiment.

In some implementations the method further comprises, in response to determining that the set of waveform data for the second experiment data does not intersect with the set of batch waveform data for the first experiment, generating a second a set of batched waveform data for the second experiment data.

In some implementations the method further comprises expanding the batched waveform data to include a set of waveform data for the second experiment data set only if the size of the expanded batched waveform data does not exceed a size limit that is dependent on space available in a memory accessible by the waveform generator hardware.

In some implementations the method further comprises receiving status data describing the status of experiments being conducted using batched waveform data and, based on a detected status condition: generating a set of batched waveform data for experimental data for a partial set of experiments from the received experiment data; and providing the experimental data for the partial set of experiments for processing by the waveform generator hardware, optionally wherein the detected status condition is a status condition indicating an underutilization of the quantum computing device.

The subject matter described in this specification can be implemented in particular ways so as to realize one or more of the following advantages.

Improvements in quantum hardware design enables qubits to be operated more efficiently, enabling rapid data collection. For example, recent improvements in quantum hardware design enable the state of a qubit to be rapidly reset. This allows operations to be performed on qubits at the rate of MHz.

Performing operations on qubits at this rate presents a classical control challenge, as loading new control waveform data at rates fast enough to take advantage of this high rate is difficult. Current systems generate a set of waveform data representing a single waveform and send this data to control electronics. When the single set of waveform data is complete, current systems send a new set of waveform data representing another single waveform. This typically requires paging the memory so new waveforms can be written while the other is running. New rates make it difficult for only these methods to keep up with the potential data rate of the qubits.

Conversely, a system that batches waveform data, as described in this specification, allows for the loading of new control waveform data at rates that are commensurate with operation times of the qubits. Waveforms may therefore be applied to qubits at a faster rate, improving the computational throughput of associated quantum computing hardware. In addition, batching waveform data, as described in this specification, improves memory storage of waveform data, since common waveforms (common components of single waveforms) are written to memory only once. Network requirements is reduced, since less data is sent to memory. Furthermore, the queuing of experiments waiting to be implemented by quantum computing hardware is improved and the quantum hardware is utilized more efficiently.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods for increasing quantum computing device throughput by efficiently transmitting waveform data to control electronics that operate qubits included in the quantum computing device. Waveform data for different experiments is batched according to commonality, available memory space and parameter configurations. The batched waveform data is sent as a single data packet to the control electronics memory, and stored in the control electronics memory. At runtime, on-board logic of the control electronics is used to step through the various waveforms needed to perform the different experiments.

Example Operating Environment

Figure 1:
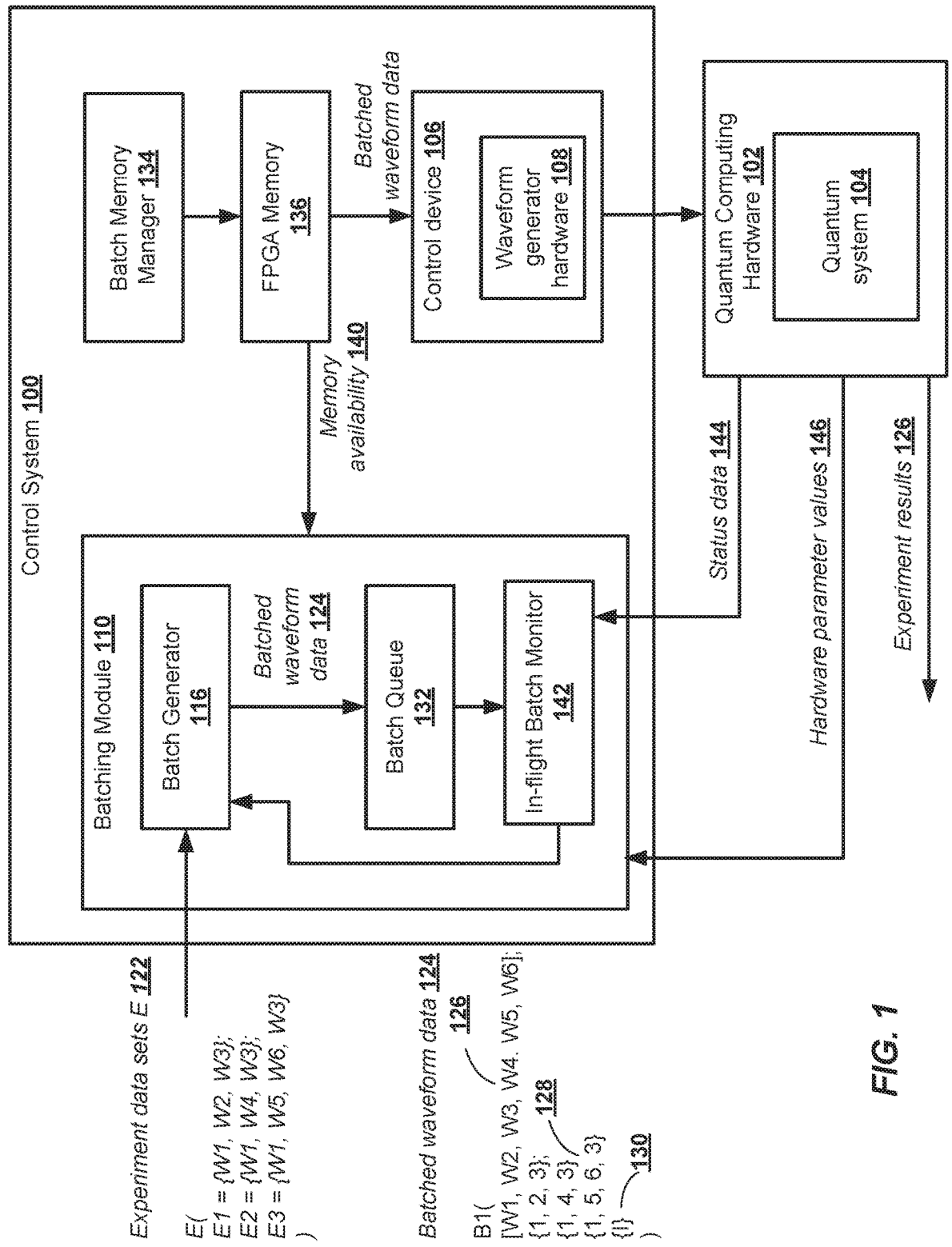
FIG. 1 depicts an example control system for operating quantum computing hardware.

FIG. 1 depicts example control system 100 for operating quantum computing hardware. The example system 100 is an example of a system implemented as computer programs on one or more computers in one or more locations, in which the systems, components, and techniques described below can be implemented.

The control system 100 is in data communication with quantum computing hardware 102. The quantum computing hardware 102 may include classical and quantum components for performing quantum computations. For example, the quantum hardware 102 may include a quantum system 104. The quantum system 104 may include one or more multi-level quantum subsystems. For convenience, the one or more multi-level quantum subsystems are referred to herein as qubits, however in some cases the one or more multi-level quantum subsystems may also include qudits.

The type of qubits that the quantum computing hardware 102 utilizes is dependent on the types of computations being performed by the quantum computing hardware 102. For example, in some cases the quantum system may include one or more resonators attached to one or more superconducting qubits, e.g., Gmon or Xmon qubits. In other cases the quantum system 104 may include ion traps, photonic devices or superconducting cavities. Further examples of realizations of qubits include fluxmon qubits, silicon quantum dots or phosphorus impurity qubits. In some cases the qubits may be a part of a quantum circuit.

The control system 100 may include one or more control devices, e.g., control device 106, that are used to operate the quantum hardware 102. The control device 106 may operate qubits in the quantum system 104 through the generation and application of one or more waveforms to the qubits. For example, the control device 106 may include waveform generator hardware 108 that generates waveforms corresponding to particular operations or experiments. The waveforms may be represented by a sequence of sub-waveforms. That is, each waveform W may include a concatenation of sub-waveforms $W_1 W_2 \ldots W_n$. An example waveform that includes a concatenation of sub-waveforms is shown below with reference to FIG. 5.

Typically, different waveforms may include common sub-waveforms. For example, multiple different waveforms may include a sub-waveform corresponding to a pulse for measuring a qubit. As another example, many different waveforms corresponding to particular operations or experiments may include a sub-waveform corresponding to a pulse for performing a particular rotation operation, e.g., a pi rotation. The location of the common sub-waveforms in the different waveforms may be the same, e.g., different waveforms may include a sub-waveform corresponding to a pulse for measuring the qubit at the end of the sequence of sub-waveforms, or may differ.

Generated waveforms may be applied to the quantum system 104 via one or more excitation drivelines. For example, one or more excitation drivelines may be coupled, e.g., via capacitive couplers, from the control device 106 to one or more respective qubits in the quantum system 104. The one or more excitation drivelines may be configured to run waveforms corresponding to different quantum operations at different frequencies. Each qubit in the quantum system 104 may be tuned towards or away from these frequencies via one or more frequency control lines.

For example, to reset a qubit included in the quantum system 104, the waveform generator hardware may generate a corresponding waveform whose energy causes the qubit to transition from its current state to its ground state and send the generated waveform through a corresponding driveline that is coupled to the qubit. Other example operations that may be performed using the control device 106 include application of quantum logic gates, e.g., rotations. Resetting a qubit and performing other operations on a qubit are also referred to herein as performing experiments.

The control device 106 may further include hardware for performing measurements on the one or more qubits included in the quantum system 104, e.g., readout resonators. To obtain statistical results of an experiment, the quantum computing hardware 102 may repeatedly generate a corresponding waveform using the waveform generator hardware, apply the generated waveform to the quantum system 104, and measure the qubit, e.g., thousands of times.

Different experiments performed by the quantum computing hardware 102 may be associated with different configurations of hardware parameters. For example, in cases where the quantum system 104 includes one or more superconducting qubits, example hardware parameters include voltage bias, microwave pulse frequency and microwave pulse power. In these examples, different groups of experiments may require that the hardware parameters are set to specific values. For example, when varying a pi pulse across different experiments, one experiment may have a pulse with a different amplitude compared to another experiment, whereas the phase of the pulse may remain the same in each experiment. In some implementations the quantum computing hardware 102 may be configured to provide data representing a current hardware parameter configuration 146 to the control system 100. For example, the quantum computing hardware 102 may be configured to provide such data when the quantum computing hardware parameter values are adjusted.

The control system 100 includes a batching module 110, a batch memory manager 112 and a FPGA memory 114. The batching module 110 includes a batch generator 116, a batch queue 118 and an in-flight batch monitor 120. The batch generator 116 receives as input multiple experiment data sets 122 that each define a respective experiment. For convenience, the batch generator 116 is illustrated as receiving three experiment data sets E1, E2 and E3. However, the input multiple experiment data sets 122 may include more (or fewer) experiment data sets.

The experiment data sets 122 each include a respective set of sub-waveforms that together represent a single waveform. Each sub-waveform is defined by respective waveform data, e.g., data specifying values of variables such as frequency, amplitude and length which uniquely determine the sub waveform. For example, as illustrated in FIG. 1, E1 and E2 each include three sub-waveforms defined by respective waveform data—{W1, W2, W3} and {W1, W4, W3}—and E3 includes four sub-waveforms represented by respective waveform data—{W1, W5, W6, W3}. The number of waveforms included in each experiment data set may vary. For convenience the experiment data sets E1-E3 are illustrated as including three or four waveforms. However, the number of sub-waveforms included in an experiment data set may include more (or fewer) sub-waveforms. In some implementations the experiment data sets 122 may further include data indicating hardware parameter configurations required to perform the respective experiments. In the example experiment data sets 122 shown in FIG. 1, it is assumed that the experiment data sets E1-E3 specify same hardware parameter configurations.

Generally, different experiment data sets can be submitted by different users of the system 100 from the same or different location.

The batch generator 116 processes the received experiment data sets 122 to generate one or more sets of batched experiment data, e.g., batched experiment data 124. To generate the one or more sets of batched experiment data, the batch generator 116 identifies, from the respective waveform data for each sub-waveform in the received experiment data sets 122, unique sub-waveforms. The example shown in FIG. 1 includes six unique sub-waveforms, each represented by respective waveform data W1-W6.

The batch generator 116 then generates, from the identified unique sub-waveforms, a corresponding set of respective waveform data that includes the respective waveform data for each unique sub-waveform, e.g., waveform data 126. For example, the corresponding set of respective waveform data that includes the respective waveform data for each unique sub-waveform shown in FIG. 1 is [W1, W2, W3, W4, W5, W6].

The batch generator 116 further generates, for each set of sub-waveforms of a respective experiment, a waveform list, e.g., waveform list 128, that references the respective waveform data in the set of respective waveform data that corresponds to the waveform in the set. For example, for the three sets of sub-waveforms E1-E3 shown in FIG. 1, the respective lists generated by the batch generator 116 are {1, 2, 3}, {1, 4, 3}, and {1, 5, 6, 3}.

The batch generator 116 further generates batch instructions (I), e.g., batch instructions 130. The batch instructions {I} are executable by the waveform generator hardware 108 and cause the waveform generator hardware 108, upon execution, to process each waveform list, e.g., waveform list 128, by selecting each referenced waveform data in the waveform list, e.g., waveform data W1, W5, W6, W3 in list {1, 5, 6, 3}. The waveform generator hardware 108 generates, in response to the selected waveform data, a single waveform that is applied in a quantum computing device. For example, as described above, the waveform generator hardware 108 may concatenate the waveform data referenced in the waveform list to generate a corresponding single waveform.

The corresponding set of respective waveform data that includes the respective waveform data for each unique sub-waveform, e.g., set 126, the generated waveform lists, e.g., list 128, and the generated batch instructions, e.g., batch instructions 130, define the set of batched waveform data 124. The set of batched waveform data 124 specifies all logic operations required to perform the experiments specified by the received experiment data sets, e.g., experiments E1, E2 and E3, together with instructions for generating sequences of logic operations that correspond to the experiments. Since the logic operations required to perform different experiments typically overlap, i.e., different experiment data sets may include a same subset of waveform data, batching the waveform data in this manner provides compact representations of different experiments that can be written to memory, stored and processed more efficiently than waveform data that is not batched.

The batch generator 116 provides the set of batched waveform data 124 to the batch queue 132. The batch queue 132 receives the batched waveform data 124 from the batch generator 116 and stores the batched waveform data 124 in a processing queue. The processing queue may include multiple batches of waveform data that are waiting to be processed by the quantum computing hardware 102.

Batched waveform data in the batch queue 132 can be kept open and expanded to include additional data corresponding to other experiment data sets received by the control system 100. For example, in some implementations the batch generator 116 may receive an additional experiment data set E4={W7, W8, W9} that includes data indicating that the experiment corresponding to experiment data set E4 requires a same hardware parameter configuration as experiment data sets E1-E3. In this implementations, the batch generator 116 may determine that the sub-waveform data included in the additional experiment data set E4, e.g., waveform data W7-W9, does not overlap with any waveform data in the set of respective waveform data that includes the respective waveform data for each unique sub-waveform of experiments E1-E3, e.g., waveform data from the set [W1, W2, W3, W4, W5, W6]. In this implementation, the batch generator 116 may open a new set of batched waveform data B2 and provide the new set of batched waveform data B2 to the batch queue 132, where it may be expanded or provided to the quantum computing hardware 102.

As another example, in some implementations the batch generator 116 may receive an additional experiment data set E5={W1, W2, W3, W10, W11, W12} that includes data indicating that the experiment corresponding to experiment data set E5 requires a same hardware parameter configuration as experiment data sets E1-E3. In this implementation, the batch generator 116 may determine that the sub-waveform data included in the additional experiment data set E5 does overlap with waveform data in the set of respective waveform data that includes the respective waveform data for each unique sub-waveform of experiments E1-E3, e.g., waveform data from the set [W1, W2, W3, W4, W5, W6]. However, the batch generator 116 may further determine, e.g., based on data received from batch memory manager 134, that expanding the batch B1 to include waveform data from experiment data set E5 would cause the size of the batch B1 to exceed the size of the FPGA memory 136. Therefore, in this implementation the batch generator 116 may open a new set of batched waveform data B3 and provide the new set of batched waveform data B3 to the batch queue 132, where it may be expanded or provided to the quantum computing hardware 102.

As another example, in some implementations the batch generator 116 may receive an additional experiment data set E6={W1, W2, W3} that includes data indicating that the experiment corresponding to experiment data set E6 requires a different hardware parameter configuration to experiment data sets E1-E5. In this implementation the batch generator 116 may open a new set of batched waveform data B4 and provide the new set of batched waveform data B4 to the batch queue 132, where it may be expanded or provided to the quantum computing hardware 102.

Generating and expanding sets of batched waveform data is described in more detail below with reference to FIGS. 2-4.

The batch memory manager 134 monitors the batch queue 132 and the FPGA memory 136, and assists in determining when to close an open batch of waveform data and write the batched waveform data to the FPGA memory 136. The batch memory manager 134 selects a particular batch of waveform data to write to the FPGA memory 136 based on the size of the FPGA memory 136 and the current availability of the FPGA memory 136. For example, the batch memory manager 134 may provide the batching module 110 with data representing the size of the memory 136 and a current availability of the memory 136. Based on this data, the batching module 110 may determine when to close an open batch of waveform data 136. For example, the batching module 110 may close an open batch of waveform data and write the closed batch to the memory 136 if the size of the batch matches the current memory availability, or if the size of the batch is close to, e.g., within a predefined amount from, the total memory capacity. In some implementations the memory manager 134 may allocate for writing at any one time no more than one half of memory available in the memory 136.

The FPGA memory 136 may include a long term memory and a temporary memory. In some implementations waveform data that is common to multiple experiments may be stored in the long term memory and waveform data that is not common to multiple experiments but is specific to a particular experiment may be stored in the temporary memory. Separating the locations in which different parts of the batched waveform data is stored can increase the speed at which the batched waveform data is written to memory and may also reduce required storage space.

Once batched waveform data is written to the FPGA memory 136, the quantum computing hardware 102 can perform experiments by downloading a set of batched waveform data and using waveform generator hardware 108 to execute the batch by processing each waveform list in the set of batched waveform data by selecting each referenced waveform data in the respective waveform list and generating a single waveform corresponding to the respective waveform list that is applied to the quantum system 104.

The in-flight batch monitor 142 receives, from the quantum computing hardware 102, status data describing the status of experiments being performed using batched waveform data, e.g., status data 144. The received status data may be processed by the in-flight batch monitor 142 to detect a status condition of the quantum computing hardware 102. For example, the status data may include data indicating whether the quantum computing hardware 102 is currently in use or idle, data indicating an activity level of the quantum computing hardware 102, or data representing experiments currently being processed by the quantum computing hardware 102 and recent experiments performed by the quantum computing hardware 102.

Based on a detected status condition, the in-flight batch monitor can cause the batching module 110 to generate a set of batched waveform data for a partial set of experiments from experiment data that is being processed by the batch generator 116 or waiting in the batch queue 132. The set of batched waveform data for the partial set of experiments can then be written to the FPGA memory 136. This can be done, for example, when an underutilization of the quantum computing hardware 102 is detected. In this manner, the quantum computing hardware 102 may avoid bottlenecks in the batch queue 132 and may remain in operation and not have periods of time where it is idle and waiting to perform experiments. This can also be done, for example, when a user who submitted a set of experiment data has been waiting for corresponding experiment results for a predefined unacceptable amount of time.

The quantum computing hardware 102 provides as output data representing experiment results, e.g., experiment results data 126. In some implementations output experiment results data may include data representing statistical results after the quantum computing hardware has performed the corresponding experiment multiple times. Such data taking may correspond to results of a specific quantum computation and/or may be used to benchmark the quantum computing hardware or to calibrate the quantum computing hardware.

Programming the Hardware

Figure 2:
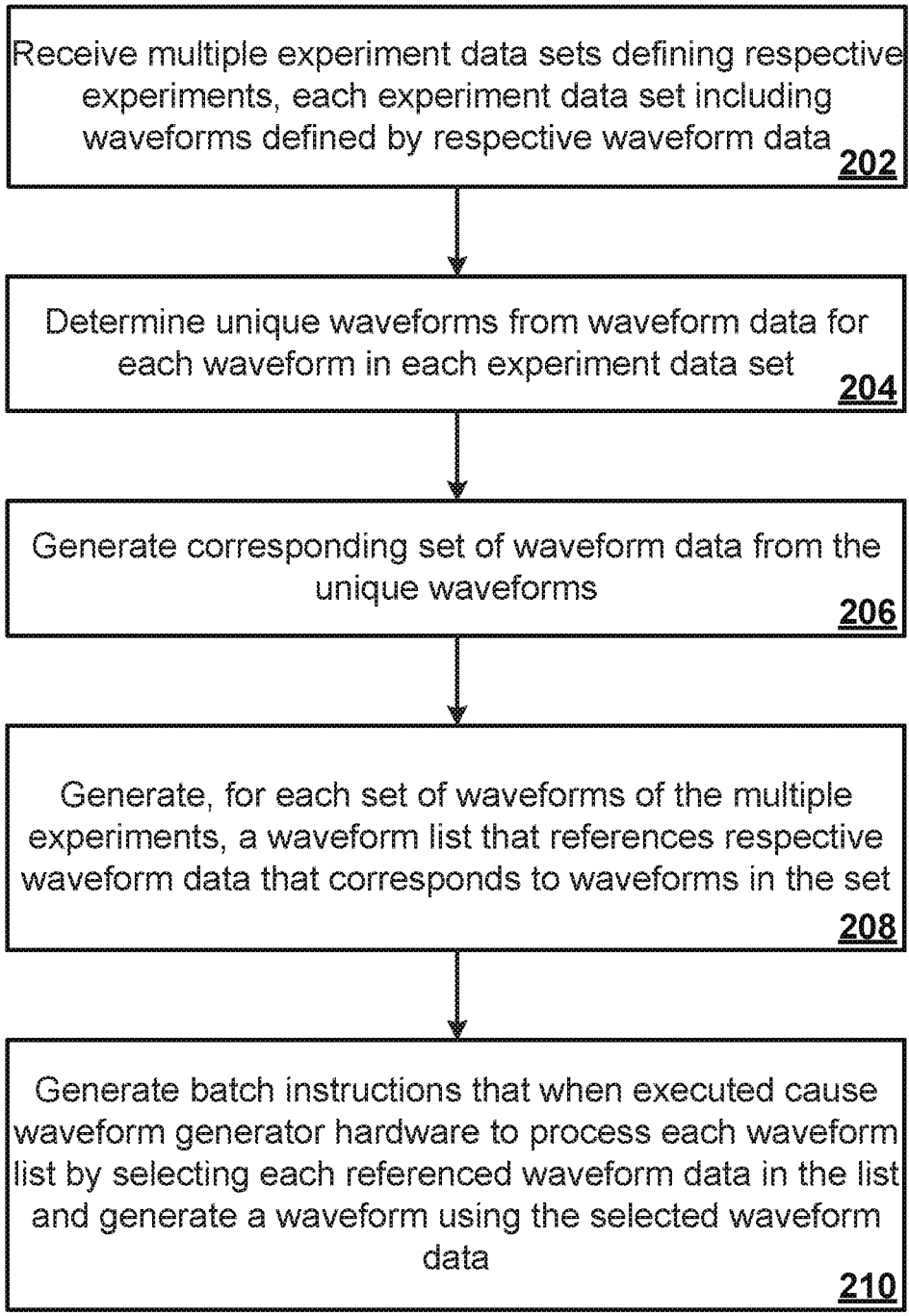
FIG. 2 is a flow diagram of an example process for generating waveforms for application in a quantum computing device.

FIG. 2 is a flow diagram of an example process 200 for generating waveforms for application in a quantum computing device. For convenience, the process 200 will be described as being performed by a system of one or more classical or quantum computing devices located in one or more locations. For example, the system 100 of FIG. 1 appropriately programmed in accordance with this specification can perform the process 200.

The system receives as input multiple experiment data sets that each define a respective experiment (step 202). Each experiment data set includes a set of waveforms, where each waveform in a respective set of waveforms is defined by respective waveform data. The set of waveforms included in a respective experiment data set may be concatenated to generate a waveform for the respective experiment data set that, when applied to one or more qubits, performs the respective experiment.

The system determines, from the respective waveform data for each waveform in each experiment data set, unique waveforms (step 204). For example, it may be the case that some waveforms included in multiple experiment data sets are the same, e.g., waveforms that correspond to a start of an experiment or waveforms that correspond to an end of an experiment. Therefore, the system may determine a set of unique waveforms from which a waveform corresponding to each of the multiple experiments may be constructed.

The system generates, from the identified unique waveforms, a corresponding set of respective waveform data that includes the respective waveform data for each unique waveform (step 206).

The system generates, for each set of waveforms of the plurality of experiments, a waveform list that references the respective waveform data in the set of respective waveform data that corresponds to the waveforms in the set (step 208).

The system generates batch instructions (step 210). The batch instructions include instructions that are executable by waveform generator hardware and that cause the waveform generator hardware, upon execution, to process generated waveform lists by selecting each referenced waveform data in a waveform list and generating, in response to the selected waveform data, a waveform that may be applied in a quantum computing device.

The corresponding set of respective waveform data described above with reference to step 206, the waveform lists described above with reference to step 208, and the batch instructions described above with reference to step 210 are generated as a set of batched waveform data and provided for application in a quantum computing device. In some implementations a generated set of batched waveform data may be expanded to include additionally received experiment data sets before it is provided for application in a quantum computing device, as described below with reference to FIGS. 3 and 4.

Figure 3:
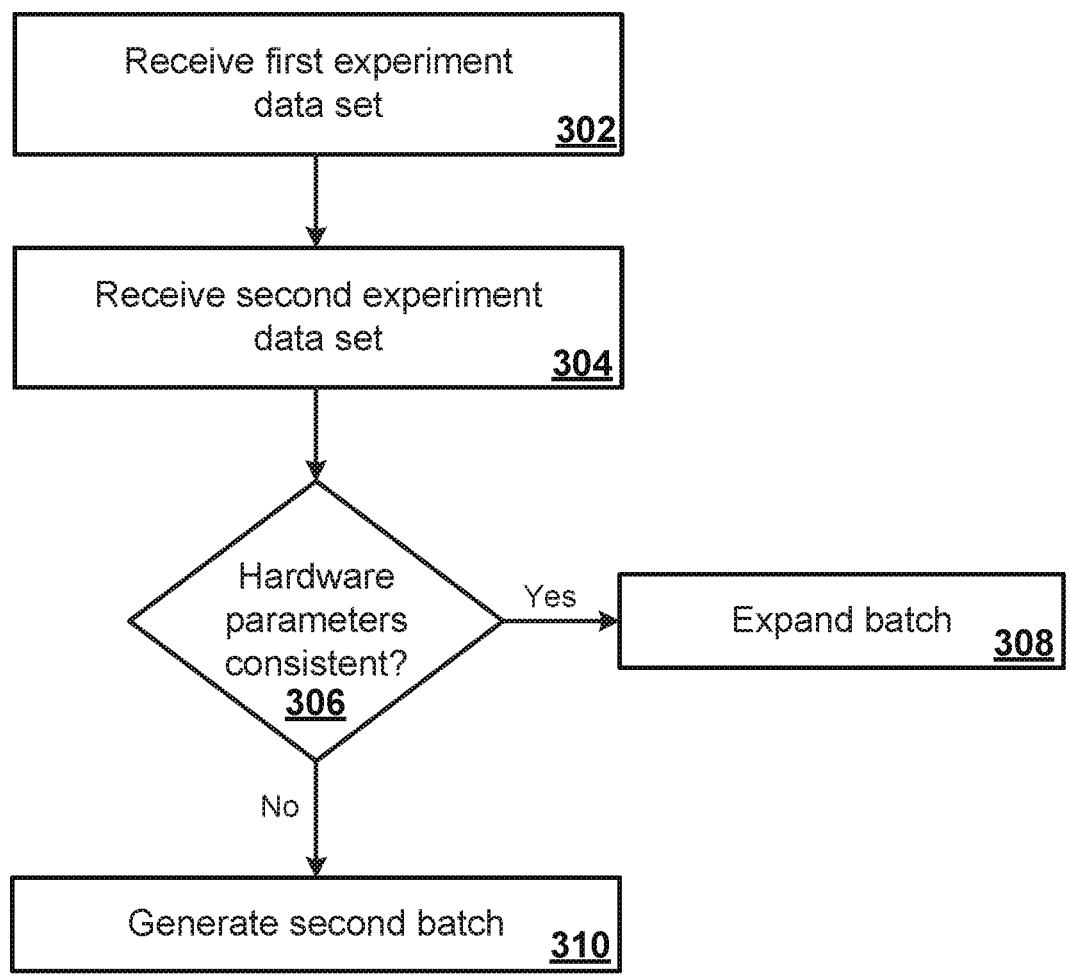
FIG. 3 is a flow diagram of an example process for generating a set of batched waveform data based on hardware parameter values.

FIG. 3 is a flow diagram of an example process 300 for generating a set of batched waveform data based on hardware parameter values. For convenience, the process 300 will be described as being performed by a system of one or more classical or quantum computing devices located in one or more locations. For example, the system 100 of FIG. 1 appropriately programmed in accordance with this specification can perform the process 300.

The system receives a first experiment data set (step 302). The first experiment data set includes a first set of waveforms, where each waveform in the first set of waveforms is defined by respective waveform data. The first experiment data also includes data indicating a first set of hardware parameter values to be used when performing the first experiment using quantum computing hardware.

The system processes the received first experiment data set using the techniques described above with reference to FIG. 2 to generate a set of batch waveform data for the first experiment. The set of batched waveform data for the first experiment includes a first set of waveform data that includes respective waveform data representing each unique waveform in the first experiment data set. The set of batched waveform data for the first experiment further includes a first waveform list that references unique waveforms in the first set of waveform data. The set of batched waveform data for the first experiment further includes first batch instructions that are executable by waveform generator hardware and cause the waveform generator hardware, upon execution, to process the first waveform list.

As an example, the set of batched waveform data for a first experiment data set $E_1 = \{W_1, W_2, W_3\}$ may include $B_1 = \{[W_1, W_2, W_3], \{1, 2, 3\}, \{I\}\}$ where $W_1, W_2, W_3$ represent the unique waveforms in the first experiment data set $E_1$, $[W_1, W_2, W_3]$ represents the first set of waveform data that includes waveform data representing each unique waveform in $E_1$, $\{1, 2, 3\}$ represents the first waveform list, and $\{I\}$ represents the first batch instructions.

The system receives a second experiment data set (step 304). The second experiment data set includes a second set of waveforms, where each waveform in the second set of waveforms is defined by respective waveform data. The second experiment data also includes data indicating a second set of hardware parameter values to be used when performing the second experiment using quantum computing hardware.

The system determines whether the second set of hardware parameter values are consistent with the first set of hardware parameter values (step 306). Determining whether the second set of hardware parameter values are consistent with the first set of hardware parameter values may include determining whether each of the hardware parameter values in the second set are the same as or close enough to, e.g., within a predefined distance to, the first set of hardware parameter values.

In response to determining that the second set of hardware parameter values are consistent with the first set of hardware parameter values, the system expands the batched waveform data for the first experiment data set to include waveform data from the second set of waveform data of the second experiment data set (step 308). For example, the system may perform steps 204 and 206 described above with reference to FIG. 2 to determine a set of unique waveforms from the waveform data for the second experiment data set. The system may then determine which of the unique waveforms are not already included in batched waveform data for the first experiment data set. The system may then generate a corresponding set of respective waveform data that includes the respective waveform data for each unique waveform that is not already included in the batched waveform data for the first experiment data set. The generated corresponding set of waveform data may then be added to the batched waveform data for the first experiment data set.

Expanding the batched waveform data for the first experiment data set further includes performing steps 208 and 210 described above with reference to FIG. 2. That is, the system generates i) waveform lists that reference the respective waveform data in the set of waveform data that corresponds to the waveforms in the second set of experiment data, and ii) corresponding batch instructions. The generated waveform list and batch instructions are added to the batched waveform data for the first experiment data set to generate the expanded batched waveform data for both the first experiment data set and second experiment data set.

Continuing the example above, the batched waveform data $B_1 = \{[W_1, W_2, W_3], \{1, 2, 3\}, \{I_1\}\}$ for the first experiment data set $E_1 = \{W_1, W_2, W_3\}$ may be expanded to include a second experiment data set $E_2 = \{W_1, W_4, W_5, W_4, W_3\}$ if it is determined that the second set of hardware parameter values for the second experiment data set $E_2$ are consistent with the first set of hardware parameter values for the first experiment data set $E_1$. In this example, the system may determine the set of unique waveforms from the waveform data for the second experiment data set $E_2$ as $W_1$, $W_4$, $W_5$, $W_3$. The system may then determine that waveforms $W_4$, $W_5$ are not already included in the set of unique waveforms in the batched waveform data $B_1$ for the first experiment $E_1$. The system may therefore expand the first set of waveform data $[W_1, W_2, W_3]$ that includes waveform data representing each unique waveform in $E_1$ to include $W_4$, $W_5$.

The system may then generate a list $\{1, 4, 5, 4, 3\}$, that references the waveform data in the second experiment data set $E_2$ and corresponding batch instructions $I_2$, both of which are added to the batched waveform data $B_1$ for the first experiment $E_1$. The resulting expanded batched waveform data in this example is $B_{1,2} = ([W_1, W_2, W_3, W_4, W_5], \{1, 2, 3\}, \{1, 4, 5, 4, 3\}, \{I_1, I_2\}$ where $W_1, W_2, W_3, W_4, W_5$ represent the unique waveforms in the first and second experiment data sets $E_1$, $E_2$, $[W_1, W_2, W_3, W_4, W_5]$ represents the set of waveform data that includes waveform data representing each unique waveform in $E_1$, $E_2$, $\{1, 2, 3\}$ represents the first waveform list, $\{1, 4, 5, 4, 3\}$ represents the second waveform list, and $\{I_1, I_2\}$ represents the expanded batch instructions.

In some implementations the system may only expand a set of batched waveform data to include a set of waveform data for a subsequently received set of experiment data if the size of the expanded set of batched waveform data will not exceed a predetermined size limit that is dependent on space available in a memory accessible by waveform generator hardware that processes batched waveform data to generate corresponding experiment waveforms.

In response to determining that the second set of hardware parameter values are not consistent with the first set of hardware parameter values, the system generates a new batch of waveform data for the second experiment data set (step 310).

The process 300 may be repeated each time a subsequent set of experiment data is received. At each repetition, the system may determine whether the subsequent hardware parameter values corresponding to the subsequent set of experiment data are consistent with the first set of hardware parameter values, the second set of hardware parameter values, and any other previously received experiment data and corresponding set of hardware parameter values. The system may only perform step (308) if the subsequent hardware parameter values are consistent with previously received hardware parameter values. In some cases the system may only perform step (308) if the subsequent hardware parameter values are consistent with previously received hardware parameter values and the size of the expanded set of batched waveforms will not exceed a predetermined size limit.

Figure 4:
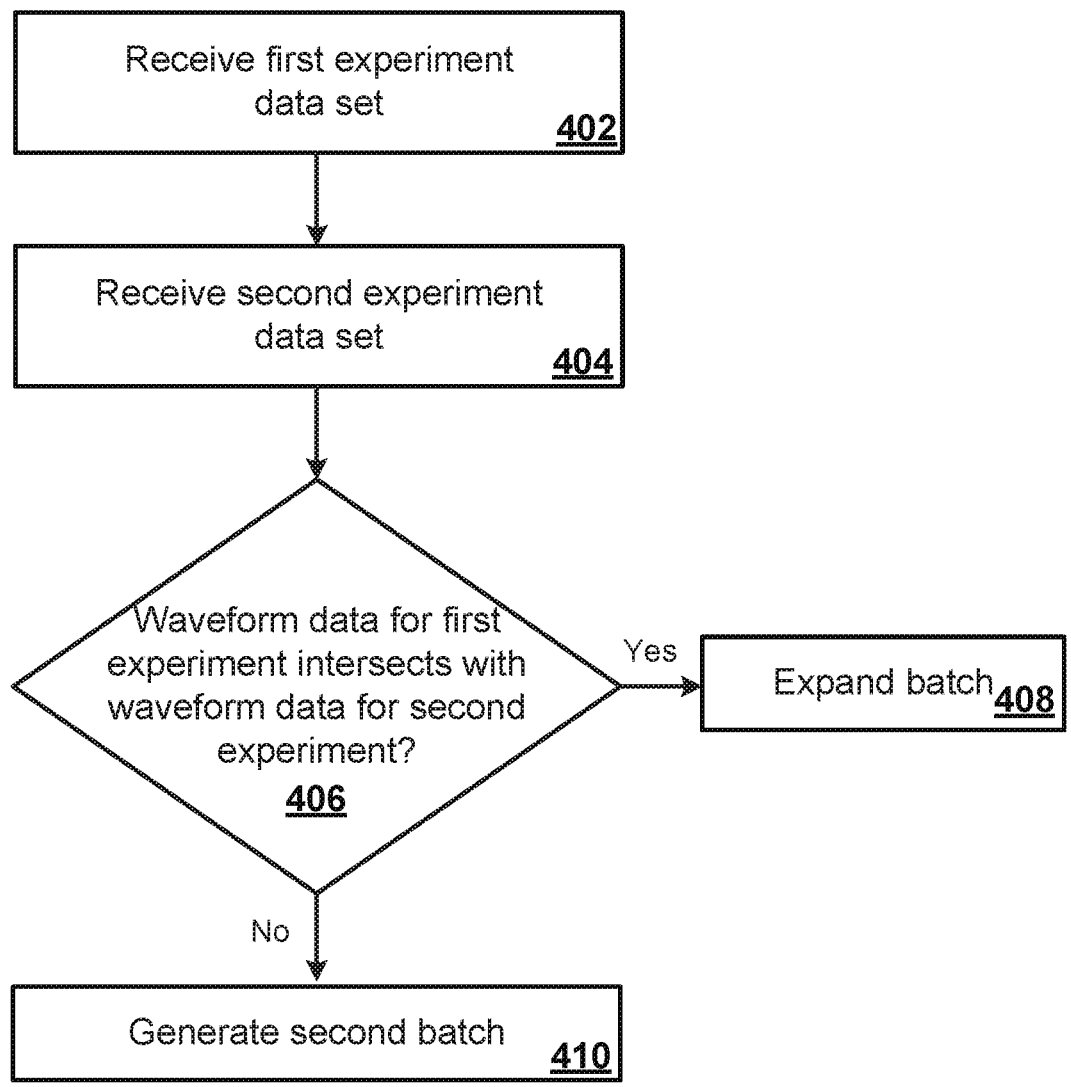
FIG. 4 is a flow diagram of an example process for generating a set of batched waveform data.

FIG. 4 is a flow diagram of an example process 400 for generating a set of batched waveform data. For convenience, the process 400 will be described as being performed by a system of one or more classical or quantum computing devices located in one or more locations. For example, the system 100 of FIG. 1 appropriately programmed in accordance with this specification can perform the process 400.

In some implementations the process 400 described below may be performed in conjunction with the process 300 of FIG. 3. For example, the system may first perform steps (302)-(306) described above with reference to FIG. 3. In response to determining that the second set of hardware parameter values are consistent with the first set of hardware parameter values, the system may perform step (406) below and determine whether a corresponding set of respective waveform data for the second experiment data intersects with the set of batch waveform data for the first experiment, and perform steps (408) or (410) accordingly. In response to determining that the second set of hardware parameter values are not consistent with the first set of hardware parameter values, the system may generate a new batch of waveform data as described in step (310) of FIG. 3.

The system receives a first experiment data set (step 402). The first experiment data set includes a first set of waveforms, where each waveform in the first set of waveforms is defined by respective waveform data. The system processes the received first experiment data set using the techniques described above with reference to FIG. 2 to generate a set of batch waveform data for the first experiment.

The system receives a second experiment data set (step 404). The second experiment data set includes a second set of waveforms, where each waveform in the second set of waveforms is defined by respective waveform data.

The system determines whether a corresponding set of respective waveform data for the second experiment data intersects with the set of batched waveform data for the first experiment (step 406). For example, the system may perform steps 204 and 206 described above with reference to FIG. 2 to determine a second set of unique waveforms from the waveform data for the second experiment data set. The system may then determine whether any of the unique waveforms in the second set of unique waveforms are already included in the set of unique waveforms in the batched waveform data for the first experiment data set. If it is determined that one or more of the unique waveforms in the second set of unique waveforms are already included in the batched waveform data for the first experiment, the system may determine that the set of respective waveform data for the second experiment data intersects with the set of batched waveform data for the first experiment.

In response to determining that a corresponding set of respective waveform data for the second experiment data intersects with the set of batch waveform data for the first experiment, the system expands the batched waveform data for the first experiment data set to include waveform data from the set of waveform data for the second experiment data set (step 408). Expanding batched waveform data for a current experiment data set to include waveform data for a subsequent experiment data set is described in detail above with reference to step 308 of FIG. 3

As also described above with reference to step 308 of FIG. 3, in some implementations the system may only expand a set of batched waveform data to include a set of waveform data for a subsequently received set of experiment data if the size of the expanded set of batched waveform data will not exceed a predetermined size limit that is dependent on space available in a memory accessible by waveform generator hardware that processes batched waveform data to generate corresponding experiment waveforms.

In response to determining that a corresponding set of respective waveform data for the second experiment data does not intersect with the set of batch waveform data for the first experiment, the system generates a new set of batched waveform data for the second experiment data (step 410).

The process 400 may be repeated each time a subsequent set of experiment data is received. At each repetition, the system may determine whether a corresponding set of waveform data for the subsequent set of experiment data intersects with any sets of previously generated batches of waveform data for previously received experiment data sets. The system may only perform step (408) if the corresponding set of waveform data for the subsequent set of experiment data intersects with any sets of previously generated batches of waveform data for previously received experiment data sets.

In some cases the system may only perform step (408) if a corresponding set of waveform data for the subsequent set of experiment data intersects with any sets of previously generated batches of waveform data for previously received experiment data sets and the size of the expanded set of batched waveforms will not exceed a predetermined size limit.

In cases where the corresponding set of waveform data for the subsequent set of experiment data intersects with multiple previously generated batches of waveform data for previously received experiment data sets, the system may select a set of batched waveform data to expand based on space availability in the memory accessible by the waveform generator hardware that processes batched waveform data to generate corresponding experiment waveforms, e.g., the system may first expand an open batch that is nearly at the predetermined size limit, or expand an open batch that has been identified has having the most overlap with the current experiment data out of all of the open batches. In this manner, the throughput and utilization of the system can be improved since the number of open batches may be restricted and the system can ensure that batches are regularly being closed and provided to waveform generator hardware.

Figure 5:
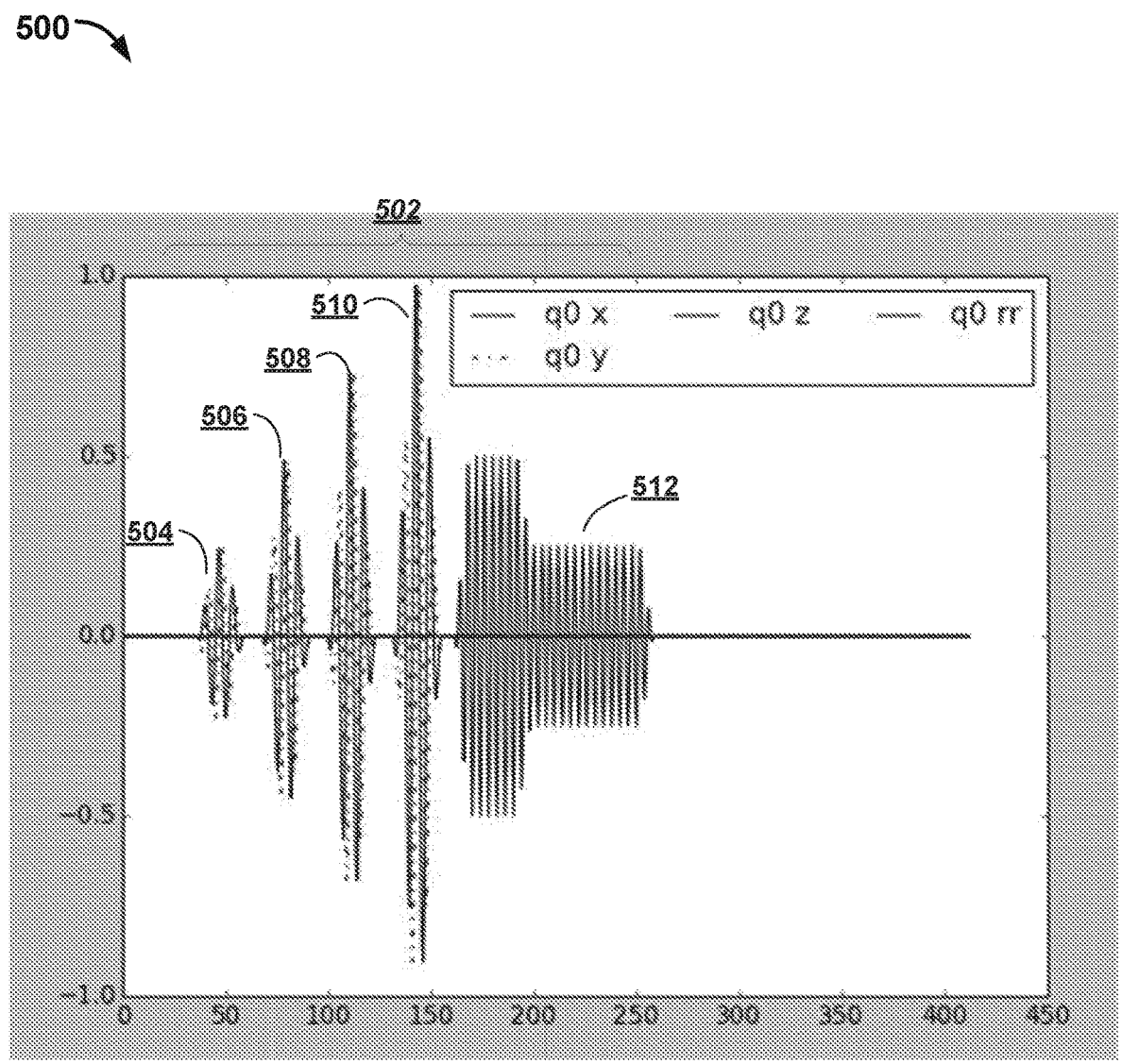
FIG. 5 is an illustration of an example waveform.

FIG. 5 is an illustration 500 of an example waveform 502. The example waveform 502 corresponds to a Rabi power driving experiment, where the probability of changing state 0 to 1 is measured as a function of drive amplitude. The example waveform 502 is plotted as a function of drive amplitude over time.

The example waveform 502 includes a concatenation of sub-waveforms 504, 506, 508, 510 and 512. Sub-waveforms 504-510 correspond to pi pulses. Sub-waveform 512 corresponds to a measurement pulse. The legend represents pulses generated by different waveform channels.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system implemented by one or more computers, comprising:
one or more digital processors implementing a batch generator that:
receives as input a plurality of experiment data sets that each defines a respective experiment, wherein:
each experiment corresponds to a qubit reset operation or a qubit rotation operation performed by quantum computing hardware,
each experiment is performed using a respective configuration of values of quantum computing hardware parameters,
each experiment data set comprises a set of waveforms, wherein each waveform in the set of waveforms is defined by respective waveform data, and
each experiment data set indicates the configuration of values of quantum computing hardware parameters required to perform the experiment defined by the experiment data set;
determines, from the respective waveform data for each waveform in each experiment data set, unique waveforms;
generates, from the unique waveforms, a corresponding set of respective waveform data that includes the respective waveform data for each unique waveform;
generates, for each set of waveforms of the plurality of experiments, a waveform list that references the respective waveform data in the set of respective waveform data that corresponds to the waveforms in the set; and batch instructions that are executable by waveform generator hardware implemented in one or more digital processors and that cause the waveform generator hardware, upon execution, to:

process each waveform list by selecting each referenced waveform data in the waveform list;

generate, in response to the selected waveform data, a waveform that is for application in a quantum computing device; and apply the waveform to one or more qubits included in the quantum computing device via one or more excitation drivelines to perform an experiment defined by the waveform;

wherein the batch generator generates the corresponding set of respective waveform data, the waveform lists and the batch instructions as a set of batched waveform data and waveform data in the set of batched waveform data corresponds to a same configuration of values of quantum computing hardware parameters.

2. The system of claim 1, further comprising a batch queue that receives, from the batch generator, the batched waveform data for the experiment data sets and stores the batched waveform data in a processing queue.

3. The system of claim 1, wherein the batch generator:

determines, for a second experiment data set received subsequent to a first experiment data set, whether a configuration of quantum computing hardware parameter values in the second experiment data set are the same as or within a predefined distance to the configuration of quantum computing hardware parameter values in the first experiment data set; and expands the batched waveform data to include a set of waveform data of the second experiment data set only if the configuration of quantum computing hardware parameter values in the second experiment data set are determined to be the same as or within a predefined distance to the configuration of quantum computing hardware parameter values in the first experiment data set.

4. The system of claim 3, further comprising, in response to determining that the quantum computing hardware parameter values for the quantum computing device in the second experiment data set are not the same as or within a predefined distance to the configuration of quantum computing hardware parameter values in the first experiment data set, generating a second a set of batched waveform data for the second experiment data.

5. The system of claim 3, wherein the configuration of quantum computing hardware parameter values for the quantum computing device includes a configuration of values of one or more of microwave frequency, microwave power, or voltage bias.

6. The system of claim 3, wherein the batch generator:

determines, for a second experiment data set received subsequent to a first experiment data set, whether a corresponding set of respective waveform data for the second experiment data intersects with the set of batch waveform data for the first experiment; and expands the batched waveform data to include the set of waveform data for the second experiment data only if the set of waveform data for the second experiment data intersects with the set of batch waveform data for the first experiment.

7. The system of claim 6, further comprising, in response to determining that the set of waveform data for the second experiment data does not intersect with the set of batch waveform data for the first experiment, generating a second set of batched waveform data for the second experiment data.

8. The system of claim 3, wherein the batch generator:

expands the batched waveform data to include a set of waveform data for the second experiment data set only if the size of the expanded batched waveform data does not exceed a size limit that is dependent on space available in a memory accessible by the waveform generator hardware.

9. The system of claim 2, further comprising an in-flight batch monitor that receives, from the quantum computing device, status data describing the status of experiments being conducted using batched waveform data and, based on a detected status condition, causes the batch generator to generate a set of batched waveform data for experimental data for a partial set of experiments from experiment data that is being processed by the batch generator and causes the batch queue to provide the experimental data for the partial set of experiments for processing by the waveform generator hardware.

10. The system of claim 9, wherein the detected status condition is a status condition indicating an underutilization of the quantum computing device.

11. The system claim 2, further comprising a memory manager that receives, from the batch queue, sets of batched waveform data and writes the sets of batched waveform data to a memory accessed by the waveform generator hardware.

12. The system of claim 11, wherein the memory manager allocates for writing at any one time no more than one half of memory available in the memory accessed by the waveform generator hardware.

13. A computer-implemented method comprising:

receiving as input a plurality of experiment data sets that each define a respective experiment, wherein:

each experiment corresponds to a qubit reset operation or a qubit rotation operation performed by quantum computing hardware, each experiment is performed using a respective configuration of values of quantum computing hardware parameters, each experiment data set comprises a set of waveforms, wherein each waveform in the set of waveforms is defined by respective waveform data, and each experiment data set indicates the configuration of values of quantum computing hardware parameters required to perform the experiment defined by the experiment data set;

determining from the respective waveform data for each waveform in each experiment data set, unique waveforms;

generating, from the unique waveforms, a corresponding set of respective waveform data that includes the respective waveform data for each unique waveform;

generating, for each set of waveforms of the plurality of experiments, a waveform list that references the respective waveform data in the set of respective waveform data that corresponds to the waveforms in the set;

generating batch instructions that are executable by waveform generator hardware and that cause the waveform generator hardware, upon execution, to process each waveform list by selecting each referenced waveform data in the waveform list;

generate, in response to the selected waveform data, a waveform that is for application in a quantum computing device; and apply the waveform to one or more qubits included in the quantum computing device via one or more excitation drivelines to perform an experiment defined by the waveform;

wherein the corresponding set of respective waveform data, the waveform list and the batch instructions are generated as a set of batched waveform data and waveform data in the set of batched waveform data corresponds to a same configuration of values of quantum computing hardware parameters.

14. The method of claim 13, wherein the method further comprises:

determining, for a second experiment data set received subsequent to a first experiment data set, whether a configuration of quantum computing hardware parameter values in the second experiment data set are the same as or within a predefined distance to the configuration of quantum computing hardware parameter values in the first experiment data set; and expanding the batched waveform data to include a set of waveform data of the second experiment data set only if the configuration of quantum computing hardware parameter values in the second experiment data set are determined to be the same as or within a predefined distance to the configuration of quantum computing hardware parameter values in the first experiment data set.

15. The method of claim 14, further comprising, in response to determining that the configuration of quantum computing hardware parameter values for the quantum computing device in the second experiment data set are not the same as or within a predefined distance to the configuration of quantum computing hardware parameter values in the first experiment data set, generating a second a set of batched waveform data for the second experiment data.

16. The method of claim 14, wherein the configuration of quantum computing hardware parameter values for the quantum computing device includes a configuration of values of one or more of microwave frequency, microwave power, and voltage bias.

17. The method of claim 14, further comprising:

determining, for the second experiment data set received subsequent to the first experiment data set, whether a corresponding set of respective waveform data for the second experiment data intersects with the set of batch waveform data for the first experiment; and expanding the batched waveform data to include the set of waveform data for the second experiment data only if the set of waveform data for the second experiment data intersects with the set of batch waveform data for the first experiment.

18. The method of claim 17, further comprising, in response to determining that the set of waveform data for the second experiment data does not intersect with the set of batch waveform data for the first experiment, generating a second a set of batched waveform data for the second experiment data.

19. The method of claim 14, further comprising:

expanding the batched waveform data to include a set of waveform data for the second experiment data set only if the size of the expanded batched waveform data does not exceed a size limit that is dependent on space available in a memory accessible by the waveform generator hardware.

20. The method of claim 13, further comprising:

receiving status data describing the status of experiments being conducted using batched waveform data and, based on a detected status condition:

generating a set of batched waveform data for experimental data for a partial set of experiments from the received experiment data; and providing the experimental data for the partial set of experiments for processing by the waveform generator hardware, optionally wherein the detected status condition is a status condition indicating an underutilization of the quantum computing device.

* * * * *